(12) United States Patent
Vedantham et al.

(10) Patent No.: US 12,210,632 B2
(45) Date of Patent: Jan. 28, 2025

(54) TRANSIENT DATASET MANAGEMENT SYSTEM

(71) Applicant: Intel Corporation, Santa Clara, CA (US)

(72) Inventors: Sundar Vedantham, Allentown, PA (US); Bin Lin, Allentown, PA (US); Pravin Pathak, Bridgewater, NJ (US); Ximing Chen, Ringoes, NJ (US); Chris MacNamara, Limerick (IE)

(73) Assignee: Intel Corporation, Santa Clara, CA (US)

( * ) Notice: Subject to any disclaimer, the term of this patent is extended or adjusted under 35 U.S.C. 154(b) by 943 days.

(21) Appl. No.: 17/083,149

(22) Filed: Oct. 28, 2020

(65) Prior Publication Data

US 2021/0049285 A1    Feb. 18, 2021

(51) Int. Cl.
*G06F 21/00* (2013.01)
*G06F 16/27* (2019.01)
*G06F 21/60* (2013.01)

(52) U.S. Cl.
CPC ............ *G06F 21/602* (2013.01); *G06F 16/27* (2019.01)

(58) Field of Classification Search
CPC ........ G06F 21/602; G06F 16/27; G06F 16/64; G06F 21/64; H04L 63/0428
See application file for complete search history.

(56) References Cited

U.S. PATENT DOCUMENTS

| 11,323,267 B1 * | 5/2022 | Griffin ................... H04L 9/085 |
| 11,779,003 B2 * | 10/2023 | K T ...................... A01M 29/16 43/112 |
| 2017/0331635 A1 | 11/2017 | Barinov et al. |
| 2018/0212772 A1 * | 7/2018 | Leavy ..................... H04L 9/085 |
| 2019/0058996 A1 * | 2/2019 | Frei ........................ H04L 9/0897 |
| 2020/0029547 A1 * | 1/2020 | Van Hecke ........... B64C 39/024 |

(Continued)

FOREIGN PATENT DOCUMENTS

WO    2020037400 A1    2/2020

OTHER PUBLICATIONS

"Expire Data from Collections by Setting TTL", MongoDB, https://www.mongodb.com/docs/manual/tutorial/expire-data/, downloaded from the internet Oct. 19, 2022, 3 pages.

(Continued)

*Primary Examiner* — Mahfuzur Rahman
(74) *Attorney, Agent, or Firm* — Compass IP Law PC

(57) ABSTRACT

Examples described herein relate to a manner of provide a time of life of data. In some examples, data and control parameters are received from a data source. The data can be encrypted and stored. In addition, at least a portion of the control parameters can be stored into a distributed ledger. In some examples, the portion of the control parameters include an indicator of expiration time of the data. In some examples, a data header for the data is generated, where the data header includes an indication that the data is subject to a limited life span and a data identifier. The data header can be accessed with a request to access the encrypted data. In some examples, a request to determine if the data is valid and accessible is provided to a node of the distributed ledger and an indication of whether the data is valid and accessible is received from a node in the distributed ledger.

16 Claims, 7 Drawing Sheets

(56) References Cited

U.S. PATENT DOCUMENTS

| | | | |
|---|---|---|---|
| 2020/0044829 A1 | 2/2020 | Binning et al. | |
| 2020/0295947 A1 | 9/2020 | Young et al. | |
| 2020/0322413 A1* | 10/2020 | Saraf | H04L 67/289 |
| 2021/0049285 A1* | 2/2021 | Vedantham | H04L 63/0428 |
| 2021/0342836 A1* | 11/2021 | Cella | H04L 9/3239 |
| 2022/0147337 A1* | 5/2022 | Michelsohn | G06F 11/1433 |

OTHER PUBLICATIONS

"Manipulate PDF Document in C#", Aspose, https://docs.aspose.com/pdf/net/manipulate-pdf-document/#ManipulatePDFDocument-HowtosetPDFexpirydate, downloaded from the internet Oct. 19, 2022, 7 pages.

"PDF & document expiry and self-destruct: Setting one-time links", Digify, https://digify.com/blog/pdf-document-expiry-and-self-destruct/, dowloaded from the internet Oct. 19, 2022, 6 pages.

"Right to be Forgotten", Radiolab, https://radiolab.org/episodes/radiolab-right-be-forgotten, Aug. 23, 2019, 1 page.

Chavez-Dreyfuss, Gertrude, "Sweden tests blockchain technology for land registry", Reuters, https://www.reuters.com/article/us-sweden-blockchain/sweden-tests-blockchain-technology-for-land-registry-idUSKCN0Z22KV, Jun. 16, 2016, 2 pages.

Kelion, Leo, "Google wins landmark right to be forgotten case", BBC News, https://www.bbc.com/news/technology-49808208, Sep. 24, 2019, 4 pages.

Nakamoto, Satoshi, "Bitcoin: A Peer-to-Peer Electronic Cash System", www.bitcoin.org, Mar. 24, 2009, 9 pages.

Shin, Laura, "Republic Of Georgia To Pilot Land Titling On Blockchain With Economist Hernando De Soto, BitFury", Forbes.com, https://www.forbes.com/sites/laurashin/2016/04/21/republic-of-georgia-to-pilot-land-titling-on-blockchain-with-economist-hernando-de-soto-bitfury/?sh=72c60b044da3, Apr. 21, 2016, 6 pages.

Yang, Tonghao, et al., "A Secure Ciphertext Self-Destruction Scheme with Attribute-Based Encryption", Hindawi Publishing Corporation, http://dx.doi.org/10.1155/2015/329626, Oct. 5, 2015, 9 pages.

International Search Report and Written Opinion for PCT Patent Application No. PCT/US21/51297, Mailed Dec. 29, 2021, 10 pages.

* cited by examiner

TRANSIENT DATASET MANAGEMENT SYSTEM

The European Union (EU) has introduced the "Right to be Forgotten" that provides rights concerning personal data. The Right to be Forgotten is found in Article 17(2) of the General Data Protection Regulation (GDPR). Under the Right to be Forgotten, personal data must be erased immediately where the data are no longer needed for their original processing purpose, or the data subject has withdrawn his consent and there is no other legal ground for processing, the data subject has objected and there are no overriding legitimate grounds for the processing, or erasure is required to fulfill a statutory obligation under the EU law or the right of the Member States. In addition, data must naturally be erased if the processing itself was against the law in the first place. The controller is therefore on the one hand automatically subject to statutory erasure obligations, and must, on the other hand, comply with the data subject's right to erasure. Similar ordinances are being rolled out in different countries across the world, including the US. Thus there is a growing need for data that should not be preserved beyond a specific point in time for various reasons.

DETAILED DESCRIPTION

Figure 1:
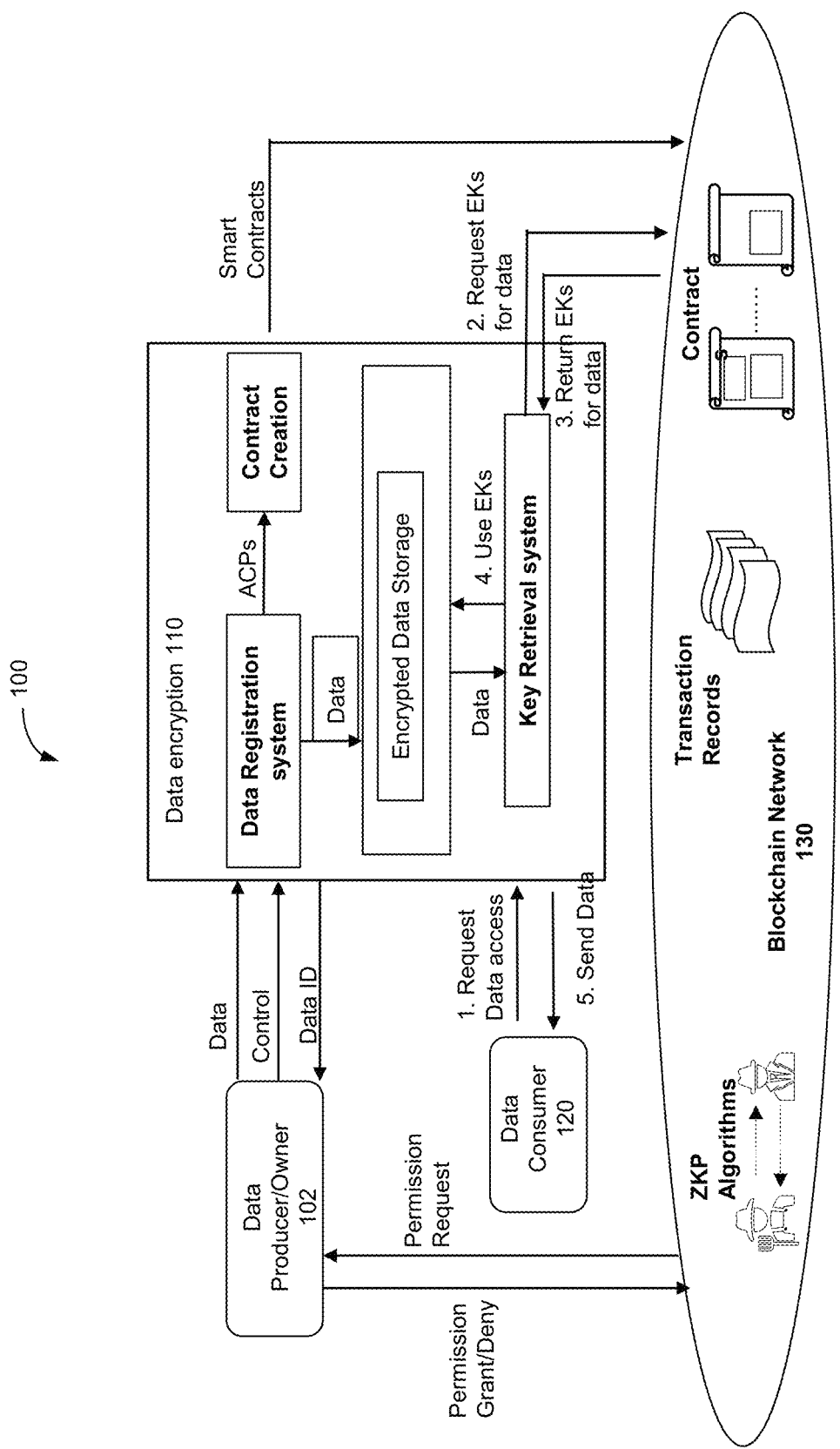
FIG. 1 depicts an example system.

There are proprietary solutions that work within closed ecosystems. For example, NETFLIX or Amazon Prime allow users to download a movie for offline viewing. Once the user starts watching the movie, a clock starts and after an amount of elapsed time (e.g., 48 hours), the movie expires and will no longer be accessible. Users are encouraged to watch the movie within two days and not keep it in their personal collection. However, such file expiration works only within proprietary ecosystems and not on general purpose server or client computing environments.

Various embodiments can control a lifetime of data (e.g., document, file, video, images, data, executable instructions, instruction code, processor executable code or binaries, or any stored content) using encryption to allow access to data within a window of time from a start time and date to an expiration time and date. Conversely, various embodiments can prevent access to data after an expiry date as the data can no longer be accessed or decrypted. Various embodiments provide for use of headers that contain timestamps and are leveraged by a framework to manage access or non-access to the data. End users browsing the Internet for content or data can experience the data expiration features described herein without knowledge that such expiration is being applied.

According to various embodiments, if data is to be subject to a lifespan specified by a TTB (Time To Birth) or TOB (Time of Birth) and/or TTL (Time To Live), data is encrypted, and a Transient Dataset Management System (TDMS) header is associated with the encrypted data. The TTL/TTB timestamp information along with the data ID can be stored in an open, immutable and distributed ledger (DL) based on Blockchain (BC) like technology. A DL or BC can include a database spread across multiple nodes or devices where a copy of the database (or a portion of the database) is stored in each node or device. A distributed ledger can include replicated and synchronized data geographically spread across multiple devices or sites (e.g., across multiple countries) with no central administrator. A decision can be made based on data in the distributed ledger matching or corresponding with each other provide a consensus. For a block chain implementation of distributed ledger, 51% or higher agreement of data can provide a consensus. Other percentages of agreement of more or less than 51% can be utilized. For a non-limiting example of a block chain, see, for example, S. Nakamoto, "Bitcoin: A Peer-to-Peer Electronic Cash System" (2009). A DL can include non-BC distributed ledger tables.

A decryption key, data identifier (ID), TTB, and TTL can be added to a distributed ledger utilized by a distributed approver system. A decryption key held in a private part of the distributed ledger. In some examples, for a data ID, a decryption key can be added at TTB and deleted after TTL expiry. In an Encryption Key Management (EKM) system, encryption keys can expire automatically, controlled by software running on an EKM server. Accordingly, if a TTB or TTL is violated (e.g., a request is made or received before TTB or after TTL), then the key can expire. In some examples, a TTB or TOB can be expressed in an absolute time (e.g., based on a reliable clock time in a particular time zone). In some examples, TTB or TOB can be expressed as an offset of time from a current time, an offset of time from a current time at which data is encrypted, or a time offset from an absolute starting time. In some examples, TTL can be expressed as an offset of time from a current time, an offset of time from a current time at which data is encrypted, or time offset from an absolute starting time.

Various embodiments can include an expiration timestamp with the data that is to have a limited life span. Various embodiments provide digital rights management (DRM) capabilities to enable a birth time and/or an expiration time to be associated with the data so that the data is only accessible after the birth time and before the expiration time. Various embodiments associate at least time to birth (TTB) (or time of birth (TOB)) and Time to Live (TTL) with data. In some examples, the data cannot be decrypted before TTB or after expiration of TTL to render the data unusable outside the intended lifespan of the dataset. Data can be encrypted, and a Transient Dataset Management System (TDMS) header can be associated with the encrypted data or added to the encrypted data. The timestamp information along with the data ID can be stored in a distributed approver system. For example, a distributed approver system can be based on blockchain (BC). Subsequently, when the encrypted data is accessed, the TDMS header associated with the data, can be read and cause a processor accessing the data to request approval using a query and the data ID of the data to the distributed approver system. The distributed approver system can look up the TTL value of the data and accept the query if the TTL has not expired or has commenced and has not expired to make the data accessible. If the TTL is valid, the query can be approved, and the processor can be allowed to decrypt the data and deliver the decrypted data to the end user. The distributed approver system can reject the query if the TTL has expired or has not commenced to make the data inaccessible.

Various embodiments could protect data under the EU data protection regulations or for other scenarios where data is to have limited lifespan (e.g., juvenile criminal records that should be purged from U.S. Government databases when the person reaches the age of 18).

Various embodiments can be supported by extensions to offload engines to enable processing of the meta-data headers such as a crypto engine built into the SoC (System on Chip) that also has the processor CPU. Various embodiments can utilize security extensions (e.g. Intel® Software Guard Extensions and Intel® QuickAssist Technology) in protecting access to data. Hyperledger Avalon blockchain can be used to encrypt and store data's TTB or TTL.

A request to access a document can cause a processor to query a distributed approver system to check if a TTB and TTL for a data ID are not violated. Subsequently, whenever the data is accessed, the TDMS header encountered at the beginning of the document, will redirect the processor accessing the data to request approval from a distributed ledger. Processor will be forced to send in a query with the data ID to the distributed ledger. The distributed ledger system can look up the TTB and TTL values of the data ID and reject the query if its TTB has not occurred or if the TTL is expired to make the data inaccessible before TTB and after TTL expiry. If the request occurs with-in the TTB and TTL, the query will be approved, and the processor will be allowed to decrypt and deliver the data to the end user. The distributed ledger can send a decryption key from its private storage which will be available only on trusted block chain (BC) nodes. The distributed approver system can provide a decryption key if the data is permitted to be accessed given applicable TTB and TTL and a time that a request was sent by the processor or a query was received by the distributed approver system.

In some examples, if data is under TDMS protection, then the data can only be decrypted by a processor certified to be TDMS compatible. A processor that attempts to decrypt the data can first assess if the data is valid or expired by querying the distributed approver system to check if a TTB and TTL for a data ID are not violated. If the distributed approver system indicates that the TTB or TTL is violated, the processor receives an indication that the data is invalid and the processor will not process the data and delete the data from memory so the data cannot be accessed again.

FIG. 1 depicts an example system. Data producer or owner 102 can request encryption of data by data center 110. Data producer or owner 102 can provide data and control (e.g., TTB and TTL) to data center 110. Data center 110 can generate Access Control Parameters (ACPs) for storage as smart contracts in blockchain network 130. An ACP for a document can include TTL/TTB, data ID, access permissions (such as read/write) set by owner, encryption keys, and so forth. Data can be encrypted using an encryption key (EK) and stored in encrypted data storage. Blockchain network 130 can store the smart contracts for the data. For example, a smart contract can include computer code managed by a blockchain where the code includes rules under which parties interact. For example, a smart contract can include a software program that records TTB and TTL values (and possibly other permission conditions for the file access) and returns an indicator of whether permission is granted or not as well as a key for granted permission. The smart contract can be executed based on the current network time stamp at time of receipt of a request to access data by data encryption system 110 or time at which a request was received from the data consumer 120.

If a data consumer 120 requests access to data, a processor at the client can request data encryption system 110 to provide the data. Data encryption system 110 can execute the smart contracts from block chain network 130 for the data to determine if the TTB or TTL are violated (e.g., a time of request for the data or time of receipt of the request for the data fit within TTB and TTL). If neither TTB nor TTL are violated, then block chain network 130 can provide the decryption key (DK) for the data and data encryption system 110 can decrypt the data using the DK and provide the decrypted data to data consumer 120. If TTB or TTL is violated, then block chain network 130 can indicate the data is invalid and data encryption system 110 can invalidate the data.

A TDMS header can be created and added to the data when the data owner creates the data and decides to protect using various embodiments described herein. In some examples, adding a document or photograph or spreadsheet to a drive or clicking on a graphical user interface (GUI) button provided inside an application such as a word processor, photo editor, or music or video editor, can trigger use of protection described herein. A owner can be prompted by a GUI to set TTB/TTL values at that time, encrypt the data and assign an ID. The ID can be used to identify and track the data. The TDMS header can stored in separate metadata section and can be unencrypted or decrypted.

In some examples, data can be downloaded by data consumer 120 prior to a TTB and accessed at or after a TTB. For example, a contend distribution network (CDN) can allow users to download content (e.g., operating system (OS) or application update, song, movie, book, file, or any content) prior to TTB, to avoid server and network utilization spikes at a release time, and the content can be available to access at or after TTB.

Figure 2:
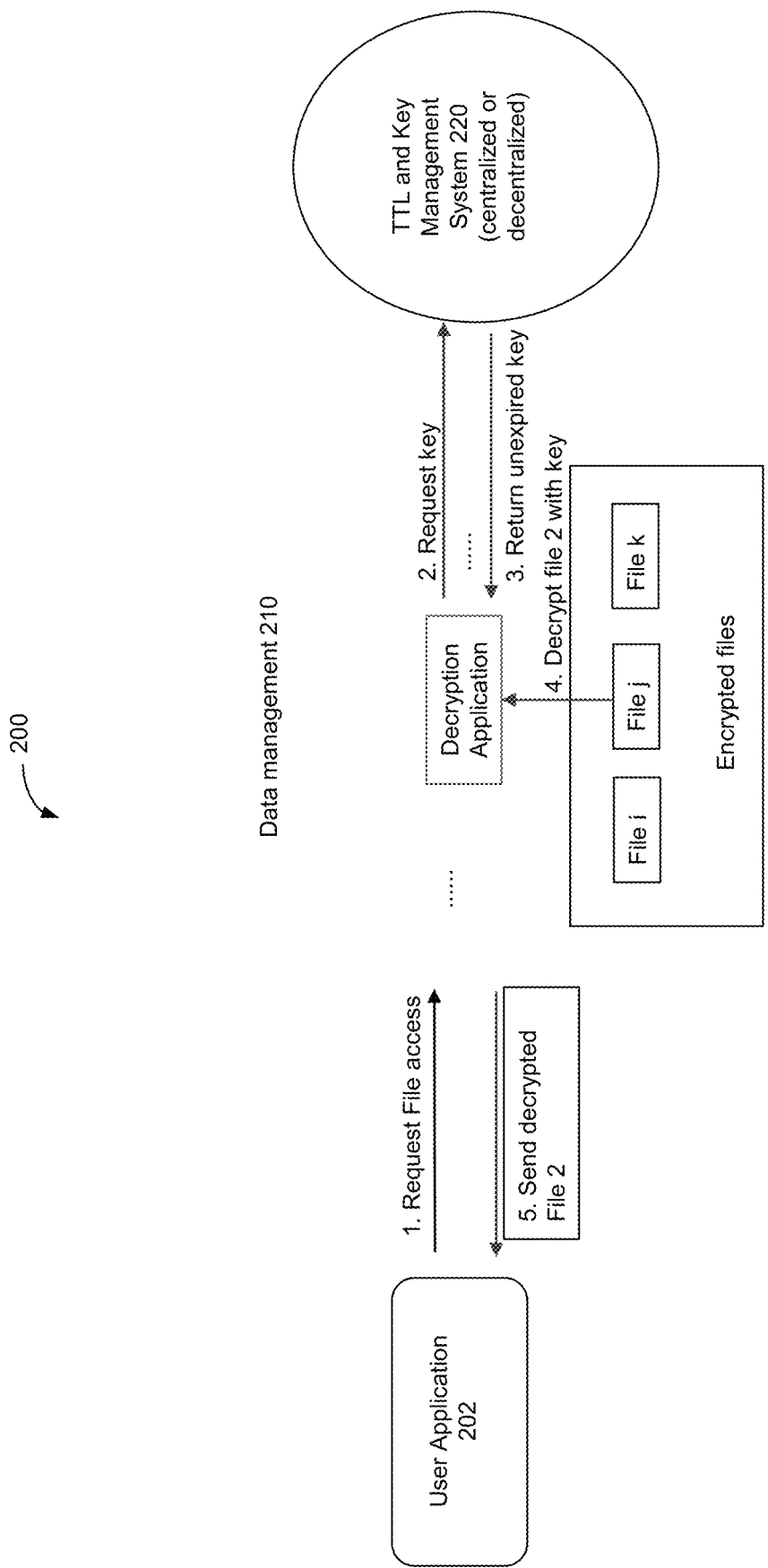
FIG. 2 depicts an example system.

FIG. 2 depicts an example system. In this example, a user application 202 can request access to a file by sending a request to data management system 210. Data can be stored as an encrypted file within a memory using any encryption scheme such as Triple Data Encryption Standard (DES), Rivest-Shamir-Adleman (RSA), Advanced Encryption Standard (AES) etc. Multiple manners of providing encryption/decryption can be used including virtualization, physical partitioning, trust domains, secure enclaves, Intel® SGX, Intel® TDX, AMD Memory Encryption Technology, AMD Secure Memory Encryption (SME) and Secure Encrypted Virtualization (SEV), ARM® TrustZone®, Apple Secure Enclave Processor, or Qualcomm® Trusted Execution Environment. A secure enclave/trust domain can be a region of memory or a processor or both that are not accessible by processes except for designated and limited processes, virtual machines, or containers.

Encryption or decryption can use, for example, total memory encryption (TME) and multi-key total memory encryption (MKTME) commercially available from Intel Corporation (as described in the Intel Architecture Memory Encryption Technologies Specification version 1.1 dated Dec. 17, 2017 and later revisions), components that make up TME and MKTME, the manner in which TME and MKTME operate, and so forth. These technologies can be used to provide a readily comprehensible perspective for understanding the various disclosed embodiments and are not intended to limit implementations to employing only TME and MKTME. TME provides a scheme to encrypt data by memory interfaces whereby a memory controller encrypts the data flowing to the memory or decrypts data flowing from memory and provides plain text for internal consumption by the processor.

In some examples, TME is a technology that encrypts a device's entire memory or portion of a memory with a key. When enabled via basic I/O system (BIOS) (or Universal Extensible Firmware Interface (UEFI), or a boot loader)

configuration, TME can provide for memory accessed by a processor on an external memory bus to be encrypted, including customer credentials, encryption keys, and other intellectual property (IP) or personal information. TME supports a variety of encryption algorithms and in one embodiment may use a National Institute of Standards and Technology (NIST) encryption standard for storage such as the advanced encryption system (AES) XTS algorithm with 128-bit keys. The encryption key used for memory encryption is generated using a hardened random number generator in the processor and is never exposed to software. Data in memory and on the external memory buses can be encrypted and is in plain text while inside the processor circuitry. This allows existing software to run unmodified while protecting memory using TME. There may be scenarios where it would be advantageous to not encrypt a portion of memory, so TME allows the BIOS (or UEFI or bootloader) to specify a physical address range of memory to remain unencrypted. The software running on a TME-capable system has full visibility into all portions of memory that are configured to not be encrypted by TME. This can be accomplished by reading a configuration register in the processor.

In some embodiments, TME can support multiple encryption keys (Multi-Key TME (MKTME)) and provides the ability to specify the use of a specific key for a page of memory. This architecture allows either processor-generated keys or tenant-provided keys, giving full flexibility to customers. VMs and containers can be cryptographically isolated from each other in memory with separate encryption keys which can be used in multi-tenant cloud environments. VMs and containers can also be pooled to share an individual key, further extending scale and flexibility.

An example enclave/trust domain can be a Trusted Execution Environment (TEE) that is an isolated execution environment that provides security features such as isolated execution (confidentiality), integrity of applications (and guest operating systems) executing with the TEE, along with confidentiality of their assets. TEEs help defend against attacks targeting underlying layers of the stack, including the host operating system, host hypervisor, devices, drivers, and firmware, by providing specialized execution environments known as "enclaves/trust domains". TEE can be a control plane for an IPU but may include some hardware enforcement logic. Each trust domain may have their own ephemeral key allowing for additional cryptographic isolation. Hardware or software link encryption methods may be used to connect two trust domains, where each trust domain may be operating on separate XPUs via an IPU.

An example enclave can be a logical collection of entities which belong to the same "trusted" domain with secure communication between entities. There can be multiple enclaves within a pod. An enclave can span across multiple servers. An enclave may include one or more shared memory domains. Entities within an enclave may contain non-shared memory regions. There may be trust relationship between enclaves. An enclave may expose parts of memory to other enclaves.

Intel's on chip UDS (Unique Device Secret) technology may be used in various embodiments. Intel's EPID (Enhanced Privacy ID) and SGX technologies can be utilized in keeping documents secure and confidential in various embodiments.

In some examples, an encrypted file can have an associated TDMS header. In some examples, the TDMS header is encrypted whereas in other examples, the TDMS header is unencrypted. In case of encrypted header, the TDMS header can be decrypted by a TDMS decoder system in a processor or memory controller where the key is maintained. When reading file, the TDMS header can be decrypted to determine a file is subject to TTB or TTL access constraints. The TDMS header can include a data ID that can be used to identify a data to a TTL and key management system 220. TTL and key management system 220 can determine if an access to the data is within time window set by the TTB and TTL.

TTB and TTL for a data ID can be stored in blockchain. TTL and key management system 220 can access the TTB and TTL and fetch a time stamp from a public access block chain to determine if the requested data can be accessed. A global registry of information that cannot be tampered with easily can be formed using blockchain technology to ensure that the TTB and TTL values cannot be altered by adversarial agencies trying to read information that has already expired. A then-current time can be provided by outside trusted source or public domain. In some cases, a block chain can indicate a current time or indicate whether file is valid or expired.

In some examples, TTL and key management system 220 can provide a TDMS header to block chain and block chain can determine if the TTB or TTL of the data are violated. If the TTB or TTL of the data are not violated, TTL and key management system 220 can indicate that the data can be decrypted and, in some cases, provide the decryption key to data management system 210. In some examples, a TTB or TTL of the data can be provided to data management system 210 and data management system 210 can determine if the data can be accessed.

In some examples, a decryption key for data is stored in a memory or cache of a CPU and TTL and key management system 220 indicates whether a TTB or TTL for the data is violated and indicates whether the data can be decrypted. If the data can be decrypted, the key can be accessed by the CPU to decrypt the data.

Figure 3:
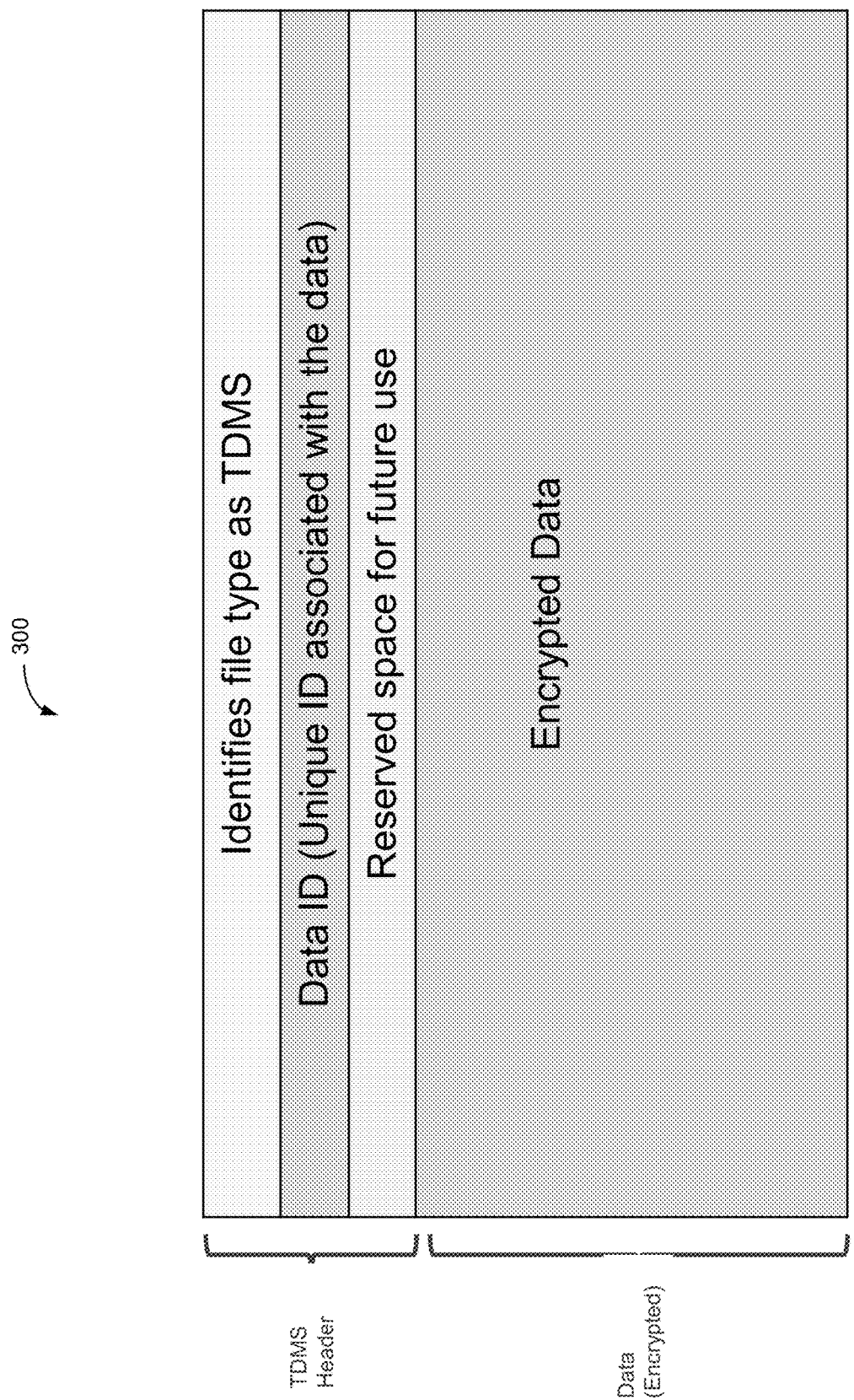
FIG. 3 depicts an example of a TDMS header and data.

FIG. 3 depicts an example of a TDMS header and data. In this example, a TDMS header can include TTB, TTL, and ID fields. Data can be encrypted and stored in a same device or different device than that which stores the associated TDMS header.

Figure 4:
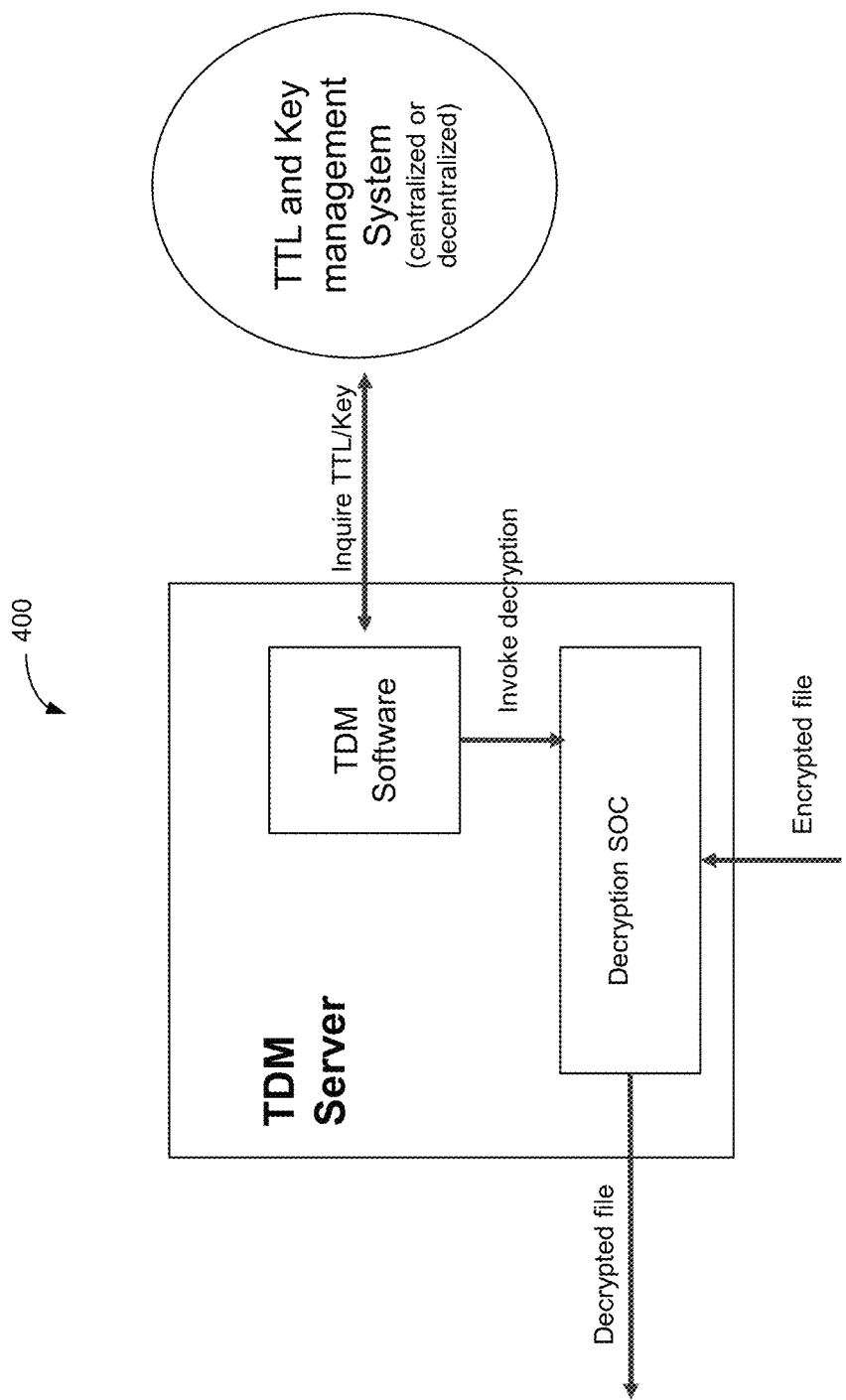
FIG. 4 depicts an example system.

FIG. 4 depicts an example system. Some processors, network interface controllers or memory controllers can have capability to perform data decryption based on TTB and TTL. Encryption/decryption key management can be implemented by a server in hardware, using technologies such as the TME or MKTME. In this case, a distributed ledger (DL) or BC may manage TTB, TTL, and current time and the determination of whether data can be accessed can be determined by the hardware based on a current time and whether the current time is within the times set by the associated TTB and TTL for the data.

Figure 5:
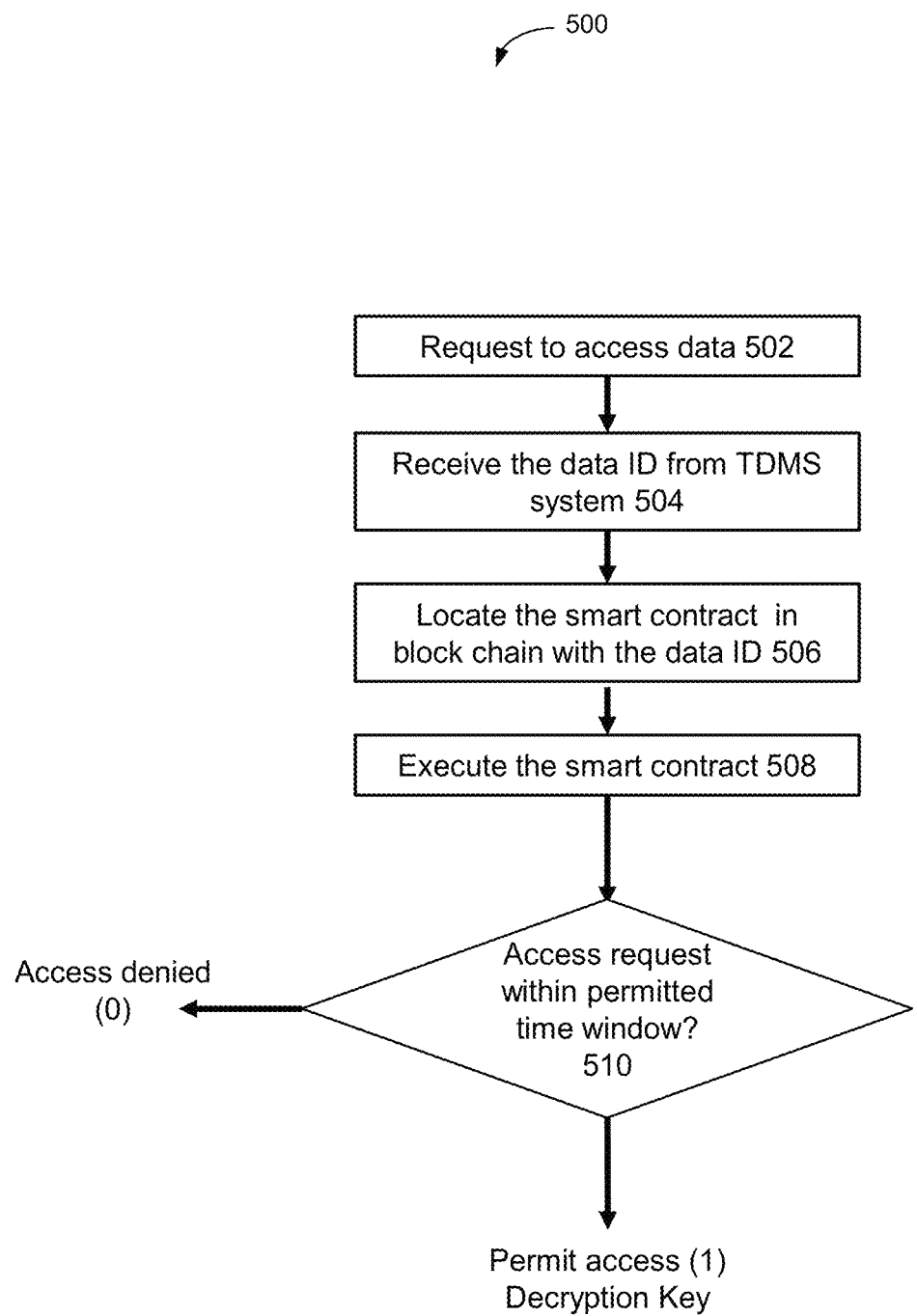
FIG. 5 depicts an example process.

FIG. 5 depicts an example process performed by a data management system. In this model, a unique ID is generated when a data is first registered with the TDMS system. The data ID is passed to a blockchain where a smart contract is created. The smart contract can be a software program that records TTB/TTL values (and possibly other permission conditions for the file access) and returns either 0 or 1 when executed based on the current network time stamp. The program returns 1 when the current time is within the TTB/TTL boundary and other conditions are met and returns 0 otherwise. The TDMS system decides if the user can access the document based on the value returned from the smart contract.

At 502, a request to access data can be received at a data management system. At 504, the data ID associated with the data can be received. The data ID can be stored in a TDMS header for the data. At 506, a smart contract can be accessed based on the data ID. At 508, the smart contract can be executed to enforce ownership and TTB/TTL. The smart contract can indicate a TTB and TTL and, in some cases, a key corresponding to the data ID. It can also list which are the entities that are allowed to see this data even within the TTB-TTL lifespan of the data to restrict its access further. At 510, a determination can be made as to whether access to the data is permitted or declined. In some examples, if a time at which a request to access data is received or sent is within a time window bounded by TTB and TTL, then the access can be permitted and a decryption key is provided. If a time at which a request to access data is received or sent is within a time window bounded by TTB and TTL, then the access can be denied. The data for which access is denied can be deleted from memory.

There are increasing number of scenarios where generated data should get automatically destroyed after a desired timeframe. For example, under legal requirements, medical records that need to be expunged due to HIPPA (Health Insurance Portability and Accountability Act) regulations can be managed using embodiments described herein. For example, information such as old bankruptcy filing that should not be accessible once the filings are inapplicable, as per European Union's Right to be Forgotten laws. For example, criminal records of minors that should be deleted when minors reach the age of 18. For example, personal details, images, or videos of users can be subject to a time to live in accordance with embodiments herein. For example, software releases made years back that may have security holes and so should not be downloaded/used can be subject to a time to live in accordance with embodiments herein. National or commercial secrets can be subject to a time to live in accordance with embodiments herein.

Figure 6:
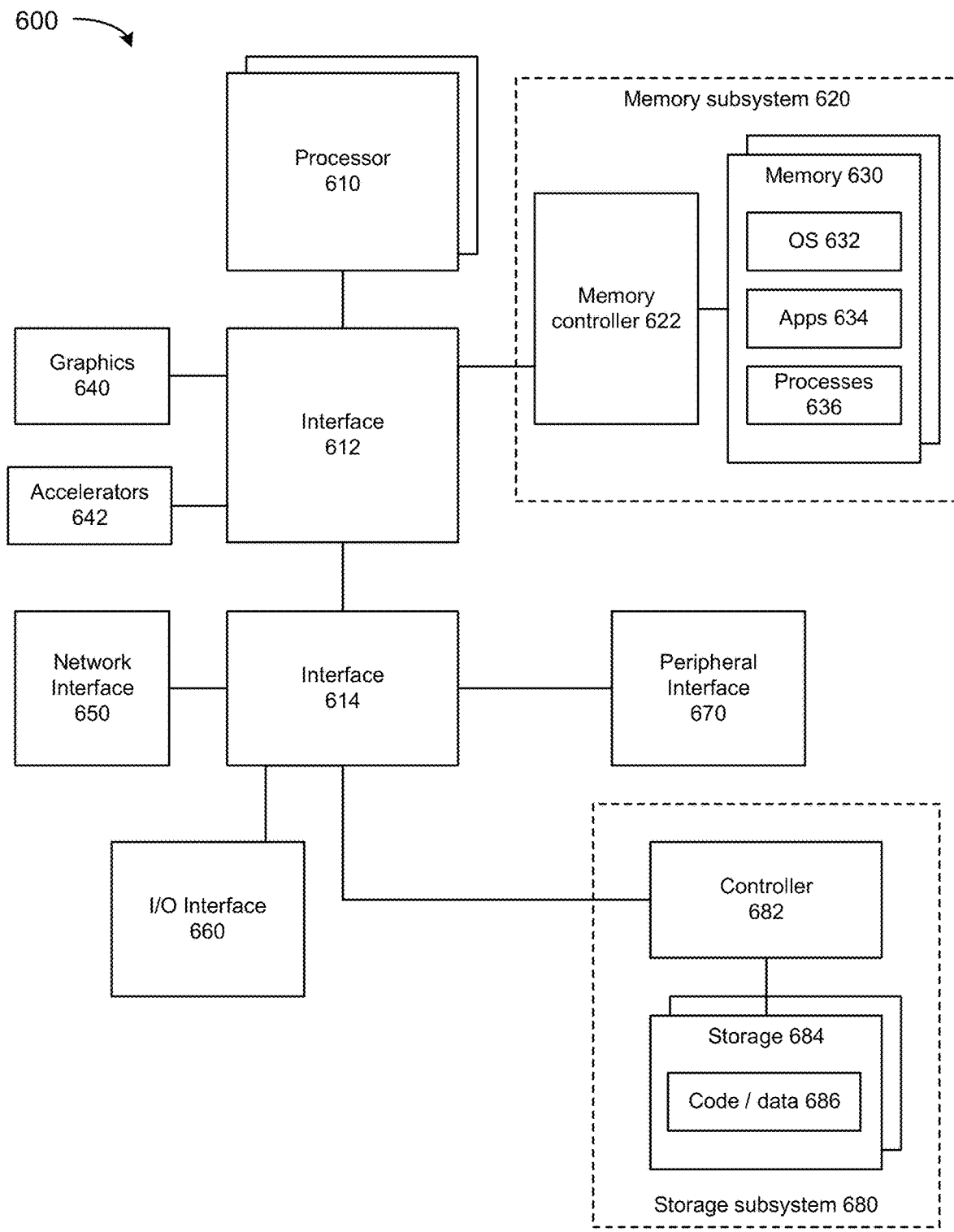
FIG. 6 depicts a system.

FIG. 6 depicts a system. The system can use embodiments described herein to manage data validity based on a life time limits. System 600 includes processor 610, which provides processing, operation management, and execution of instructions for system 600. Processor 610 can include any type of microprocessor, central processing unit (CPU), graphics processing unit (GPU), processing core, or other processing hardware to provide processing for system 600, or a combination of processors. Processor 610 controls the overall operation of system 600, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 600 includes interface 612 coupled to processor 610, which can represent a higher speed interface or a high throughput interface for system components that needs higher bandwidth connections, such as memory subsystem 620 or graphics interface components 640, or accelerators 642. Interface 612 represents an interface circuit, which can be a standalone component or integrated onto a processor die. Where present, graphics interface 640 interfaces to graphics components for providing a visual display to a user of system 600. In one example, graphics interface 640 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 640 generates a display based on data stored in memory 630 or based on operations executed by processor 610 or both. In one example, graphics interface 640 generates a display based on data stored in memory 630 or based on operations executed by processor 610 or both.

Accelerators 642 can be a programmable or fixed function offload engine that can be accessed or used by a processor 610. For example, an accelerator among accelerators 642 can provide compression (DC) capability, cryptography services such as public key encryption (PKE), cipher, hash/authentication capabilities, decryption, or other capabilities or services. In some embodiments, in addition or alternatively, an accelerator among accelerators 642 provides field select controller capabilities as described herein. In some cases, accelerators 642 can be integrated into a CPU socket (e.g., a connector to a motherboard or circuit board that includes a CPU and provides an electrical interface with the CPU). For example, accelerators 642 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 642 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 620 represents the main memory of system 600 and provides storage for code to be executed by processor 610, or data values to be used in executing a routine. Memory subsystem 620 can include one or more memory devices 630 such as read-only memory (ROM), flash memory, one or more varieties of random access memory (RAM) such as DRAM, or other memory devices, or a combination of such devices. Memory 630 stores and hosts, among other things, operating system (OS) 632 to provide a software platform for execution of instructions in system 600. Additionally, applications 634 can execute on the software platform of OS 632 from memory 630. Applications 634 represent programs that have their own operational logic to perform execution of one or more functions. Processes 636 represent agents or routines that provide auxiliary functions to OS 632 or one or more applications 634 or a combination. OS 632, applications 634, and processes 636 provide software logic to provide functions for system 600. In one example, memory subsystem 620 includes memory controller 622, which is a memory controller to generate and issue commands to memory 630. It will be understood that memory controller 622 could be a physical part of processor 610 or a physical part of interface 612. For example, memory controller 622 can be an integrated memory controller, integrated onto a circuit with processor 610.

While not specifically illustrated, it will be understood that system 600 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 600 includes interface 614, which can be coupled to interface 612. In one example, interface 614 represents an interface circuit, which can include standalone components and integrated circuitry. In one example, multiple user interface components or peripheral components, or both, couple to interface 614. Network interface 650 provides system 600 the ability to communicate with remote devices (e.g., servers or other computing devices) over one or more networks. Network interface 650 can include an Ethernet adapter, wireless interconnection components, cellular network interconnection components, USB (universal serial bus), or other wired or wireless standards-based or proprietary interfaces. Network interface 650 can transmit data to a device that is in the same data center or rack or a remote device, which can include sending data stored in memory. Network interface 650 can receive data from a remote device, which can include storing received data into memory. Various embodiments can be used in connection with network interface 650, processor 610, and memory subsystem 620.

In one example, system 600 includes one or more input/output (I/O) interface(s) 660. I/O interface 660 can include one or more interface components through which a user interacts with system 600 (e.g., audio, alphanumeric, tactile/touch, or other interfacing). Peripheral interface 670 can include any hardware interface not specifically mentioned above. Peripherals refer generally to devices that connect dependently to system 600. A dependent connection is one where system 600 provides the software platform or hardware platform or both on which operation executes, and with which a user interacts.

In one example, system 600 includes storage subsystem 680 to store data in a nonvolatile manner. In one example, in certain system implementations, at least certain components of storage 680 can overlap with components of memory subsystem 620. Storage subsystem 680 includes storage device(s) 684, which can be or include any conventional medium for storing large amounts of data in a nonvolatile manner, such as one or more magnetic, solid state, or optical based disks, or a combination. Storage 684 holds code or instructions and data 686 in a persistent state (e.g., the value is retained despite interruption of power to system 600). Storage 684 can be generically considered to be a "memory," although memory 630 is typically the executing or operating memory to provide instructions to processor 610. Whereas storage 684 is nonvolatile, memory 630 can include volatile memory (e.g., the value or state of the data is indeterminate if power is interrupted to system 600). In one example, storage subsystem 680 includes controller 682 to interface with storage 684. In one example controller 682 is a physical part of interface 614 or processor 610 or can include circuits or logic in both processor 610 and interface 614.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). Another example of volatile memory includes cache or static random access memory (SRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In some embodiments, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), Intel® Optane™ memory, NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 600. More specifically, power source typically interfaces to one or multiple power supplies in system 600 to provide power to the components of system 600. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 600 can be implemented using interconnected compute sleds of processors, memories, storages, network interfaces, and other components. High speed interconnects can be used such as PCIe, Ethernet, or optical interconnects (or a combination thereof).

Figure 7:
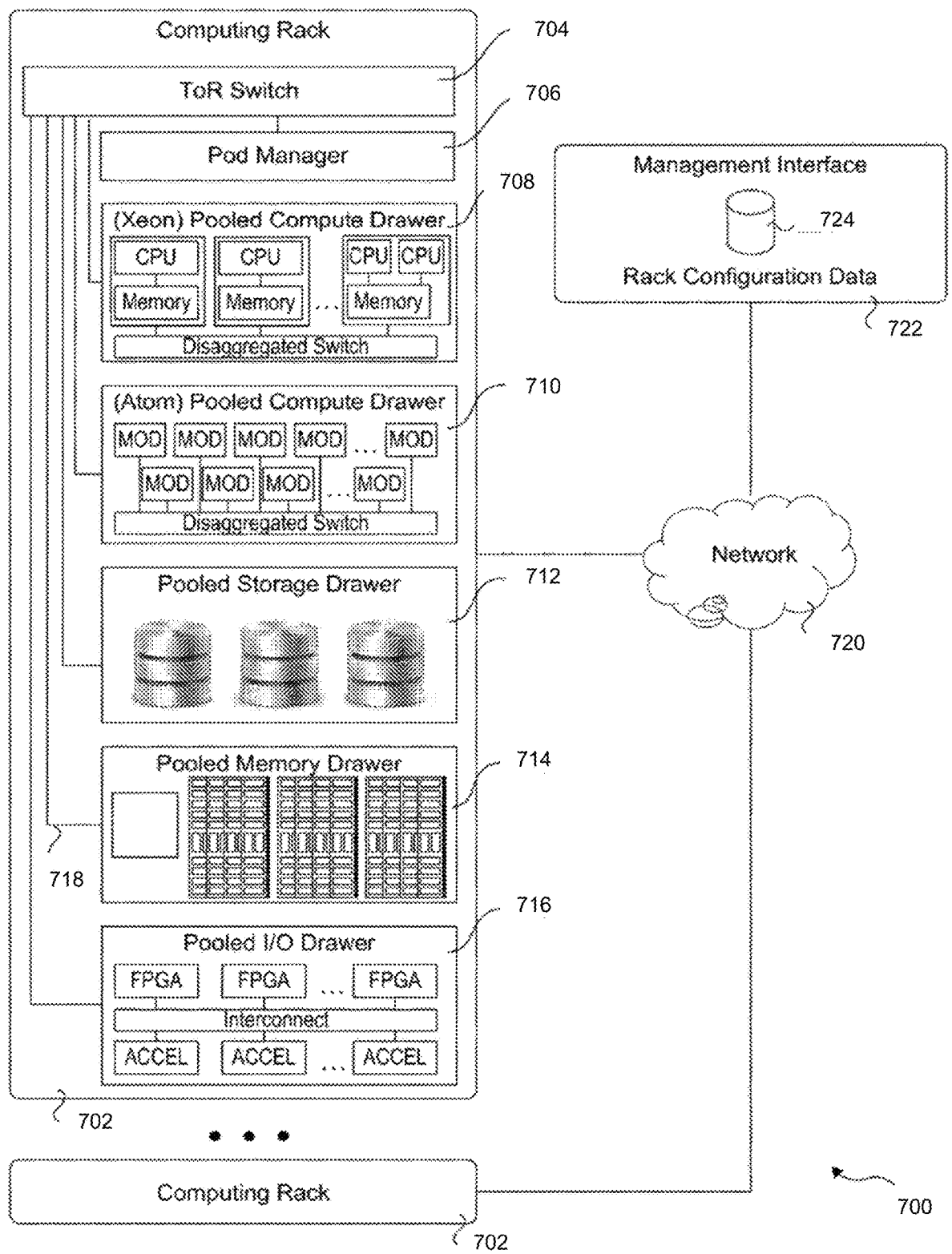
FIG. 7 depicts an example environment.

FIG. 7 depicts an environment 700 includes multiple computing racks 702, each including a Top of Rack (ToR) switch 704, a pod manager 706, and a plurality of pooled system drawers. The environment can use embodiments described herein to manage data validity based on a life time limits. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 708, and Intel® ATOM™ pooled compute drawer 710, a pooled storage drawer 712, a pooled memory drawer 714, and a pooled I/O drawer 716. Each of the pooled system drawers is connected to ToR switch 704 via a high-speed link 718, such as a 40 Gigabit/second (Gb/s) or 100 Gb/s Ethernet link or a 100+Gb/s Silicon Photonics (SiPh) optical link. In some embodiments, high-speed link 718 comprises an 800 Gb/s SiPh optical link.

Multiple of the computing racks 702 may be interconnected via their ToR switches 704 (e.g., to a pod-level switch or data center switch), as illustrated by connections to a network 720. In some embodiments, groups of computing racks 702 are managed as separate pods via pod manager(s) 706. In some embodiments, a single pod manager is used to manage all of the racks in the pod. Alternatively, distributed pod managers may be used for pod management operations.

Environment 700 further includes a management interface 722 that is used to manage various aspects of the environment. This includes managing rack configuration, with corresponding parameters stored as rack configuration data 724. Environment 700 can be used for computing racks.

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), on-premises data centers, off-premises data centers, edge network elements, fog network elements, and/or hybrid data centers (e.g., data center that use virtualization, cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," or "logic." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores"

may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Flow diagrams as illustrated herein provide examples of sequences of various process actions. The flow diagrams can indicate operations to be executed by a software or firmware routine, as well as physical operations. In some embodiments, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, and so forth.

Example 1 includes a method comprising: receiving data and control parameters from a data source; encrypting the data; storing the encrypted data; and storing at least a portion of the control parameters into a distributed ledger, wherein the portion of the control parameters comprises an indicator of expiration time of the data.

Example 2 includes any example, and includes generating a data header for the data, the data header to include an indication that the data is subject to a limited life span and a data identifier and storing the data header for access with the encrypted data.

Example 3 includes any example, and includes providing a request to determine if the data is valid and accessible to a node in the distributed ledger and receiving an indication of whether the data is valid and accessible from a node in the distributed ledger.

Example 4 includes any example, wherein the indicator of expiration time of the data comprises a time to live or an offset from a time.

Example 5 includes any example, and includes providing a request to determine if the data is valid and accessible to a node in the distributed ledger; receiving an indication of whether the data is valid and accessible from a node in the distributed ledger; based on the encrypted data being valid and accessible, decrypting the encrypted data using a decryption key; and providing the decrypted data to a requester.

Example 6 includes any example, wherein based on the encrypted data being valid and accessible, receiving the decryption key from a node in the distributed ledger.

Example 7 includes any example, wherein based on the encrypted data being valid and accessible, permitting access to the decryption key by a processor that performs the decrypting the encrypted data.

Example 8 includes any example, and includes a non-transitory computer-readable medium comprising instructions stored thereon, that if executed by one or more processors, cause the one or more processors to: access data and control parameters provided by a data source; encrypt the data; store the encrypted data; and store at least a portion of the control parameters into a distributed ledger, wherein the portion of the control parameters comprise an indicator of expiration time of the data.

Example 9 includes any example, and includes instructions stored thereon, that if executed by one or more processors, cause the one or more processors to: generate a data header for the data, the data header to include an indication that the data is subject to a limited life span and a data identifier and store the data header.

Example 10 includes any example, and includes instructions stored thereon, that if executed by one or more processors, cause the one or more processors to: provide a request to determine if the data is valid and accessible to a node in the distributed ledger and receive an indication of whether the data is valid and accessible from a node in the distributed ledger.

Example 11 includes any example, wherein the indicator of expiration time of the data comprises a time to live or an offset from a time.

Example 12 includes any example, and includes instructions stored thereon, that if executed by one or more processors, cause the one or more processors to: provide a request to determine if the data is valid and accessible to a node in the distributed ledger; receive an indication of whether the data is valid and accessible from a node in the distributed ledger; based on the encrypted data being valid and accessible, decrypt the encrypted data using a decryption key; and provide the decrypted data to a requester.

Example 13 includes any example, wherein based on the encrypted data being valid and accessible, receive the decryption key from a node in the distributed ledger.

Example 14 includes any example, wherein based on the encrypted data being valid and accessible, permit access to the decryption key by a processor that performs the decrypt the encrypted data.

Example 15 includes any example, and includes a system comprising: a network interface; at least one memory; at least one processor, the at least one processor to perform operations comprising: access data and control parameters provided by a data source; encrypt the data; store the encrypted data; and store at least a portion of the control parameters into a distributed ledger, wherein the portion of the control parameters comprise an indicator of expiration time of the data.

Example 16 includes any example, wherein the at least one processor is to: generate a data header for the data, the data header to include an indication that the data is subject to a limited life span and a data identifier and store the data header.

Example 17 includes any example, wherein the at least one processor is to: provide a request to determine if the data is valid and accessible to a node in the distributed ledger and receive an indication of whether the data is valid and accessible from a node in the distributed ledger.

Example 18 includes any example, wherein the indicator of expiration time of the data comprises a time to live or an offset from a time.

Example 19 includes any example, wherein the at least one processor is to: provide a request to determine if the data is valid and accessible to a node in the distributed ledger; receive an indication of whether the data is valid and accessible from a node in the distributed ledger; based on the encrypted data being valid and accessible, decrypt the encrypted data using a decryption key; and provide the decrypted data to a requester.

Example 20 includes any example, wherein the at least one processor is part of a server, rack of servers, data center, or edge network element.

What is claimed is:

1. A method comprising:
   receiving data and control parameters from a data source;
   encrypting the data;
   storing the encrypted data;
   storing at least a portion of the control parameters into a system of storage devices, wherein the portion of the control parameters comprises an indicator of expiration time of the data and wherein the indicator of expiration time of the data comprises a time to live or an offset from a time;
   receiving an indication of whether the data is not expired;
   based, at least in part, on the encrypted data being not expired, decrypting the encrypted data using a decryption key and providing the decrypted data to a requester.

2. The method of claim 1, comprising:
   generating a data header for the data, the data header to include an indication that the data is subject to a limited life span and a data identifier and
   storing the data header for access with the encrypted data.

3. The method of claim 1, comprising:
   providing a request to determine if the data is not expired to a system in the system of storage devices and
   receiving an indication of whether the data is not expired from the system in the system of storage devices.

4. The method of claim 1, wherein based, at least in part, on the encrypted data being not expired, receiving the decryption key from the system in the system of storage devices.

5. The method of claim 1, wherein based, at least in part, on the encrypted data being not expired, permitting access to the decryption key by a processor that performs the decrypting the encrypted data.

6. At least one non-transitory computer-readable medium comprising instructions stored thereon, that if executed by one or more processors, cause the one or more processors to:
   access data and control parameters provided by a data source;
   encrypt the data;
   store the encrypted data;
   store at least a portion of the control parameters into a system of storage devices, wherein the portion of the control parameters comprise an indicator of expiration time of the encrypted data and wherein the indicator of expiration time of the data comprises a time to live or an offset from a time;
   receive an indication of whether the data is not expired; and
   based, at least in part, on the encrypted data being not expired, decrypt the encrypted data using a decryption key and provide the decrypted data to a requester.

7. The non-transitory computer-readable medium of claim 6, comprising instructions stored thereon, that if executed by one or more processors, cause the one or more processors to:
   generate a data header for the data, the data header to include an indication that the data is subject to a limited life span and a data identifier and
   store the data header.

8. The non-transitory computer-readable medium of claim 6, comprising instructions stored thereon, that if executed by one or more processors, cause the one or more processors to:
   provide a request to determine if the data is not expired to a system in the system of storage devices and
   receive an indication of whether the data is not expired from the system in the system of storage devices.

9. The non-transitory computer-readable medium of claim 6, wherein based, at least in part, on the encrypted data being not expired, receive the decryption key from a system in the system of storage devices.

10. The non-transitory computer-readable medium of claim 6, wherein based, at least in part, on the encrypted data being not expired, permit access to the decryption key by a processor that performs the decrypt the encrypted data.

11. The non-transitory computer-readable medium of claim 6, comprising instructions stored thereon, that if executed by one or more processors, cause the one or more processors to:
    decrypt the data before the expiration time of the data.

12. The non-transitory computer-readable medium of claim 6, wherein the system of storage devices comprises a distributed ledger.

13. A system comprising:
a network interface;
at least one memory;
at least one processor, the at least one processor to perform operations comprising:
access data and control parameters provided by a data source;
encrypt the data;
store the encrypted data;
store at least a portion of the control parameters into a system of storage devices, wherein the portion of the control parameters comprise an indicator of expiration time of the data and wherein the indicator of expiration time of the data comprises a time to live or an offset from a time;
receive an indication of whether the data is not expired; based, at least in part, on the encrypted data being not expired, decrypt the encrypted data using a decryption key and provide the decrypted data to a requester.

14. The system of claim 13, wherein the at least one processor is to:
generate a data header for the data, the data header to include an indication that the data is subject to a limited life span and a data identifier and
store the data header.

15. The system of claim 13, wherein the at least one processor is to:
provide a request to determine if the data is not expired to a system in the system of storage devices and
receive an indication of whether the data is not expired from the system in the system of storage devices.

16. The system of claim 13, comprising a server, rack of servers, data center, or edge network element, wherein the at least one processor is part of the server, rack of servers, data center, or edge network element.

* * * * *